United States Patent [19]

Coren

[11] Patent Number: 4,571,113
[45] Date of Patent: Feb. 18, 1986

[54] LOCKING JOINTS

[76] Inventor: Alfred S. Coren, 113 Hunnewell St., Needham, Mass. 02194

[21] Appl. No.: 593,912

[22] Filed: Mar. 27, 1984

[51] Int. Cl.[4] ............................................... F16D 1/00
[52] U.S. Cl. .................................... 403/322; 403/328; 81/177.85
[58] Field of Search ............. 403/322, 328; 81/177 G, 81/177.85

[56] References Cited

U.S. PATENT DOCUMENTS

| | | | |
|---|---|---|---|
| 1,982,008 | 11/1934 | Mandl et al. | 403/238 |
| 2,108,866 | 2/1938 | Mandl | 81/177 G UX |
| 3,011,794 | 12/1961 | Vaughn | 81/177 G X |

Primary Examiner—Andrew V. Kundrat

[57] ABSTRACT

There is disclosed in the present application a locking joint for securing together a male and a female member, illustrated in the present application being employed for securing together the parts of a socket wrench assembly including the sockets themselves as well as such auxiliary equipment as extensions and ratchet drives. In each joint, there is incorporated in the male member a lock in the form of a spring-pressed member mounted for sliding motion at an acute angle to the axis of the joint and having its outward end chisel-shaped to provide a tooth which engages the interior of the female member with a wedging action.

9 Claims, 5 Drawing Figures

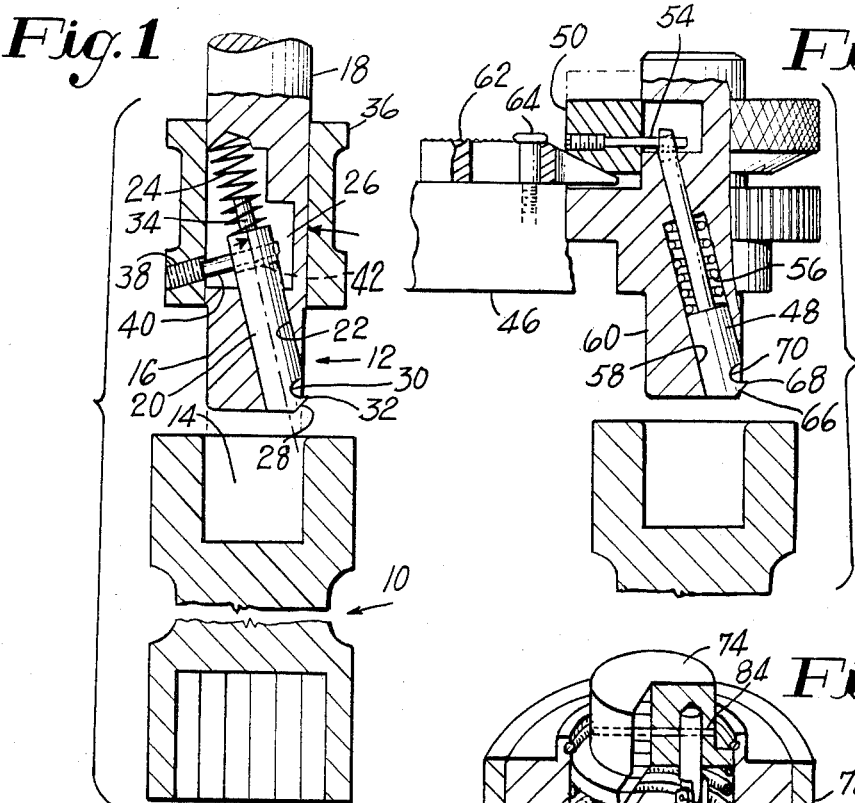
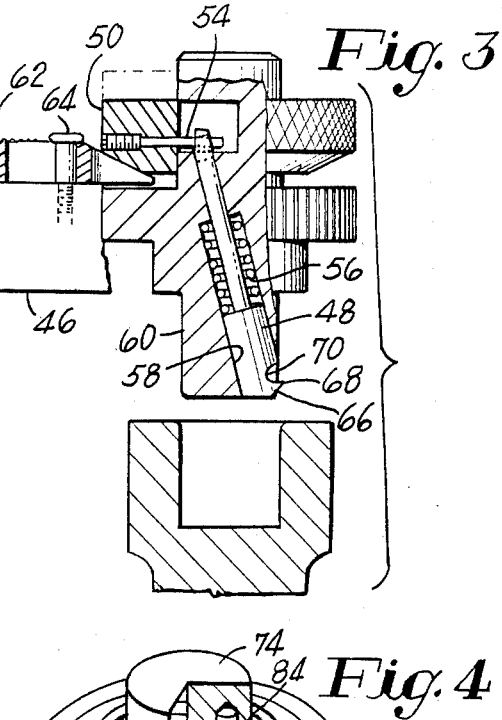
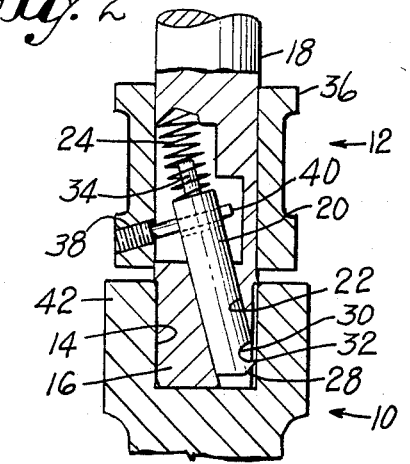
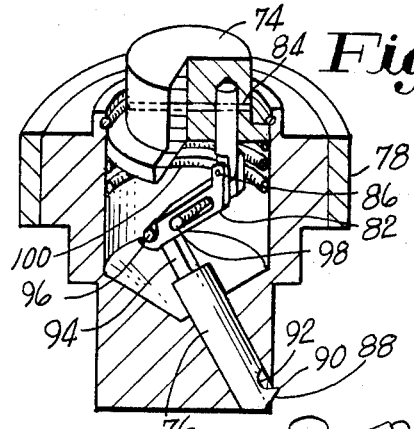
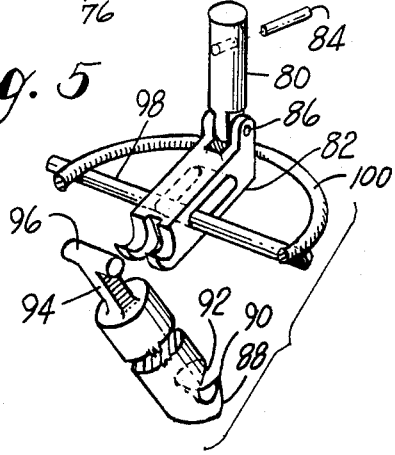
Fig. 1
Fig. 2
Fig. 3
Fig. 4
Fig. 5

LOCKING JOINTS

The present application relates generally to improvements in locking joints including male and female members, but more particularly to such joints which are quickly engageable and releasable and in which the male member is provided with a lock or retainer for securing the two parts of the joint together against separation under expected withdrawal forces.

Although joints according to the present invention are useful for a number of applications including socket wrench assemblies, other tools and scaffolding sections, the male and female members will hereinafter be refered to respectively as studs and sockets in the interest of clarity and simplicity of expression. This terminology will be employed regardless of the environment in which the joint occurs.

There is a wide variety of conventional locking joints available for such purposes as assembling socket wrench and scaffolding members. These conventional joint constructions, however, generally present one or the other of two severe problems which substantially reduce their effectiveness and utility. One of these problems is the tendency for the resistance to separation to be substantially reduced and the locking member to be of little or no effect after one of the parts, usually the socket, has become worn. This reduced effectiveness is particularly likely in locking joints in which the locking member is a spring pressed ball in the stud. In order to overcome the tendency of worn parts of joints to separate, some of the sockets are formed with one or more internal recesses. If the socket is formed with a single recess, it is ineffective unless aligned with the locking device of the stud. Because aligning the single recess with the locking feature on the stud is time consuming each time the socket is changed in using socket wrenches, an expedient has been developed in the form of four interior recesses in the female members of socket wrench sets. This expedient not only adds substantially to the cost of such sets but also causes unexpected delays because of the fact that many shops employ a variety of unmatched sockets, some of which not only are not formed with four recesses but may not even include a single recess.

It is accordingly an object of the present invention to improve the reliability and durability of locks for joints.

Another object is to provide effectiveness over a long useful life in joints, especially those which are to be repeatedly assembled and disassembled in continuing frequent use.

A more particular object is to provide an economical joint structure especially useful in connection with socket wrench assemblies.

In the achievement of the foregoing objects, a feature of the invention relates to a joint including male and female members, in which the male member is provided with a spring-pressed lock slidable in a guideway formed at an acute angle to the length or axis of the male member. The outer or leading end of the lock is formed with a camming surface engaged by the leading end of the socket to cause the lock to be retracted into the stud and to engage the interior of the socket with a locking action as a relatively sharp chisel point immediately behind the camming surface engages the interior of the socket. According to a related feature of the invention, the lock is connected with an exterior lock release member and the connection is such that it maintains the orientation of the chisel point on the lock in position to engage the socket.

The foregoing objects and features of the invention will be more fully understood and appreciated from the following detailed description of illustrative embodiments taken in connection with the accompanying drawings in which:

FIG. 1 is a view in longitudinal cross section of a joint according to the present invention comprising a stud and a socket, shown with the parts in separated relationship as occurs before the stud is introduced into the socket;

FIG. 2 is a view similar to FIG. 1 but showing the parts of the joint assembled;

FIG. 3 is a view in vertical cross section of an alternative construction of a joint according to the invention, particularly applicable to a ratchet drive for socket wrenches;

FIG. 4 is a view in vertical cross section of a second alternative construction of a joint according to the present invention also suitable for ratchet drives; and FIG. 5 is a view in perspective showing the parts of the alternative construction of FIG. 4, in separated relationship for clarity.

Turning now to the drawings, particularly FIGS. 1 and 2, there is shown a locking joint according to the present invention, including a female member or socket and a male member or stud generally indicated at 10 and 12 respectively. In these two views, the parts of the joint are shown as units of a socket wrench assembly. It will be appreciated, however, that the construction shown herein is applicable with minor modifications to added utility in such diverse uses as detachably connecting tool handles and the parts of scaffolding. The socket 10 is formed with a cavity 14 of square cross-section adapted to receive a loosely fitting stud 16, shown typically as forming the lower end portion of a socket wrench extension 18.

There is fitted inside the extension 18 a lock or retainer 20 of cylindrical form, slidable in a guideway 22 and pressed outwardly by a spring 24. The guideway 22 is oriented with respect to the axis of the stud 16 at an acute angle indicated at 26 and generally in the range of 10 to 25 degrees, the value of the angle depending upon the size of the stud and the holding characteristics required. The outer end of the retainer 20 is formed with a camming surface 28 which is engaged by the wall of the cavity 14 to cause the retainer to be retracted in the guideway 22. There is also an indentation 30 in the outer end portion of the retainer for defining with the camming surface 28 a chisel edge 32 which tends to bite into without penetrating the interior wall of the socket 14. The inner end of the retainer 20 is formed with a reduced diameter 34 sized to enter inside and guide the spring 24. For releasing the retainer from engagement with the interior wall of the socket, there is provided a collar 36 which is slidable on the extension 18 and is connected to the retainer by a screw 38, threaded into the collar and formed with a reduced diameter 40 to pass loosely through an enlarged opening 42 in the retainer 20. The collar 36 is thus coupled to the retainer 20 so that the retainer is released from engagement with the interior wall of the socket cavity by retracting the collar away from the socket. When the socket 10 is applied to the stud 16, the camming surface 28 is engaged by the leading edge of the socket to cause retraction of the retainer 20 so that no special effort is required in applying the socket to the stud and to obtain the locking action.

A variation of the present construction suitable for such applications as rachet drives of socket wrenches in which the distance between the socket installed on the stud and an obstruction in the form of a ratchet body 46 preventing normal motion of the collar 36, is shown in FIG. 3 and comprises a retainer 48 of the same general form as the retainer 20. For retracting the retainer 48, there is provided a collar 50 connected by a threaded pin 52 which passes loosely through an aperture in a reduced diameter 54 of the retainer 48. The reduced diameter 54 is surrounded by a compression spring 56 which urges the retainer outwardly in essentially the same manner as the retainer 20. It will be appreciated that the retainer 48 is slidable in a guideway 58 in a stud 60. Because of the short length of the stud 60 imposed by its environment, the retainer 48 is somewhat shorter in its major diameter than is the retainer 20. In addition, there is provided for retracting the retainer 20 a bifurcated wedge 62 which enters beneath the collar 50 and is slidably retained on the ratchet body 46 by a shoulder screw 64. By pushing the wedge 62 to the right, as shown in FIG. 3, the retainer 48 is retracted to release the related socket as is the case with the retainer 20. The locking end of the retainer 48 is formed in essentially the same manner as that of the retainer 20, including a camming surface 66 and a chisel point 68 defined between the camming surface and a recess 70.

The alternative described with reference to FIG. 3 has the advantage of avoiding the release of a socket by the application of axial pressure to the top of the ratchet body 46. Under conditions in which it is desirable to release the socket from locking engagement with the stud by depressing a plunger, a second alternative construction depicted in FIGS. 4 and 5 offers the advantage of speed and convenience of operation. This emboidment comprises an operating plunger 74 which is connected to a retainer 76 having the same general locking action as the retainers 20 and 48 but a different retracting means to suit the environment and manner of use. The plunger 74 is captive for limited in and out motion in a ratchet body 78 and is connected to the retainer 76 through elements comprising a link 80 and a pivoted bifurcated lever @2. The link 80 is pivotally connected to the lever 82 at 84 and to the plunger 74 at 86. The active end of the retainer 76 is formed, like its already described counterparts, with a camming surface 88 and a chisel point 90 defined between the camming surface and a recess 92. At its other end, the retainer 76 is formed with a reduced diameter 94 and a crosshead 96 engaged by the related forked arm of the lever 86 which is pivoted on a pin 98. The retainer is maintained by a spring 100 in a normally extended position in preparation for being engaged by a related socket cavity. The spring 100 accomplishes its function by pressing the plunger 74 outwardly from the body 78.

From the disclosure of my invention, numerous variations in such matters as the combinations and relative placement of the various parts, which are well within the scope of the present invention, will become obvious to those of ordinary skill in the art. It is accordingly not intended that the foregoing description and drawings be taken in a limiting sense but rather that the scope of the invention be interpreted in terms of the appended claims.

Having thus disclosed my invention, what I claim as new and desire to secure by Letters Patent of the United States is:

1. A joint for coupling two members comprising a female member formed with a cavity defined by a complement of smooth, uninterrupted walls, an elongated stud of cross-section complementary with and sized loosely to enter the cavity and having a longitudinal axis, a guideway formed in the stud at an acute angle to the axis, a retainer slidable in the guideway and formed with an outer cavity-engaging end, spring means urging the retainer outwardly from the stud to occupy a normal position with its distal end outside the cross-section of the stud, means for causing the retainer to be withdrawn into the stud when the stud is embraced by the cavity, and means on the retainer for detachably engaging the smooth wall of the cavity when the members are interengaged.

2. A joint according to claim 1 further characterized in that the cross section of the cavity and the stud is of polygonal shape.

3. A joint according to claim 1 further characterized in that the guideway is of cylindrical cross-section.

4. A joint according to claim 1 further characterized in that the acute angle at which the guideway is oriented with respect to the axis measures between 10 and 25 degrees.

5. A joint according to claim 1 further comprising an externally mounted release means coupled to the retainer and operable to retract the retainer to cause it to free the female member from engagement.

6. A joint according to claim 5 further characterized in that the release means comprises a collar slidably mounted on the stud and connected to the retainer.

7. A joint for coupling two members comprising a female member formed with a cavity, an elongated stud of cross-section complementary with and sized loosely to enter the cavity and having a longitudinal axis, a guideway formed in the stud at an acute angle to the axis, a retainer slidable in the guideway and formed with an outer cavity-engaging end, spring means urging the retainer outwardly from the stud to occupy a normal position with its distal end outside the cross-section of the stud, means for causing the retainer to be withdrawn into the stud when the stud is embraced by the cavity, and means on the retainer including a chisel shaped edge at its outer end adapted for detachably engaging the wall of the cavity under the force of the spring means when the members are interengaged.

8. A joint according to claim 7 further characterized in that the chisel edge on the retainer is defined between a camming surface and a recess spaced from the end.

9. A joint according to claim 8 further comprising an externally mounted release means coupled to the retainer and operable to retract the retainer to free the female member from engagement including a plunger mounted generally in alignment with the stud and a linkage between the plunger and the retainer.

* * * * *